Jan. 30, 1962 W. C. BELK ETAL 3,018,592
CONTAINER FILLING APPARATUS
Filed Oct. 30, 1958 7 Sheets-Sheet 1

INVENTORS
WILBER C. BELK
SAMUEL H. ELLISON, JR.
BY *Hans G. Hoffmeister*
ATTORNEY Jan. 30, 1962 W. C. BELK ETAL 3,018,592
CONTAINER FILLING APPARATUS
Filed Oct. 30, 1958 7 Sheets-Sheet 3

INVENTORS
WILBER C. BELK
SAMUEL H. ELLISON, JR.

BY Hans G. Hoffmeister
ATTORNEY

Jan. 30, 1962 W. C. BELK ETAL 3,018,592
CONTAINER FILLING APPARATUS
Filed Oct. 30, 1958 7 Sheets-Sheet 4
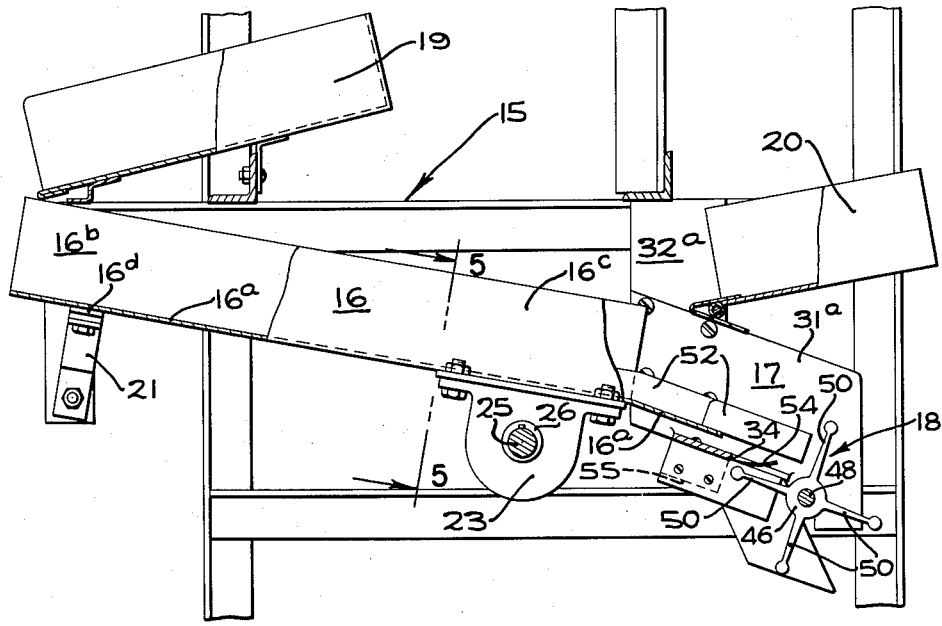
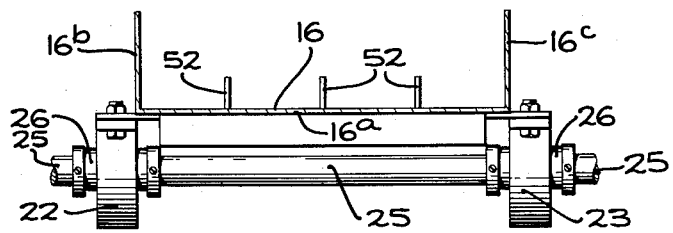
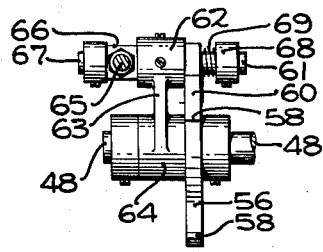
INVENTORS
WILBER C. BELK
SAMUEL H. ELLISON JR.
BY Hans F. Hoffmeister
ATTORNEY

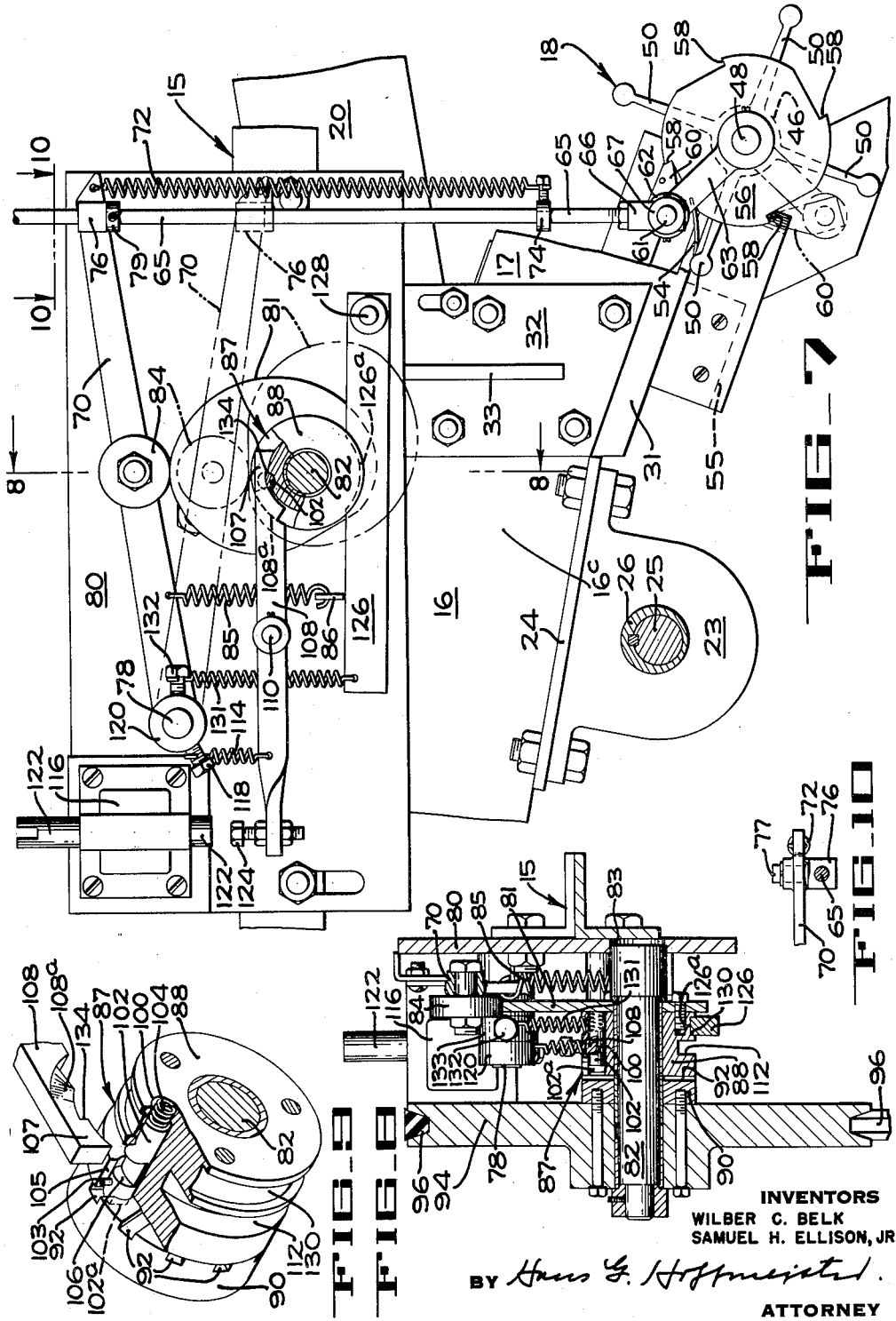

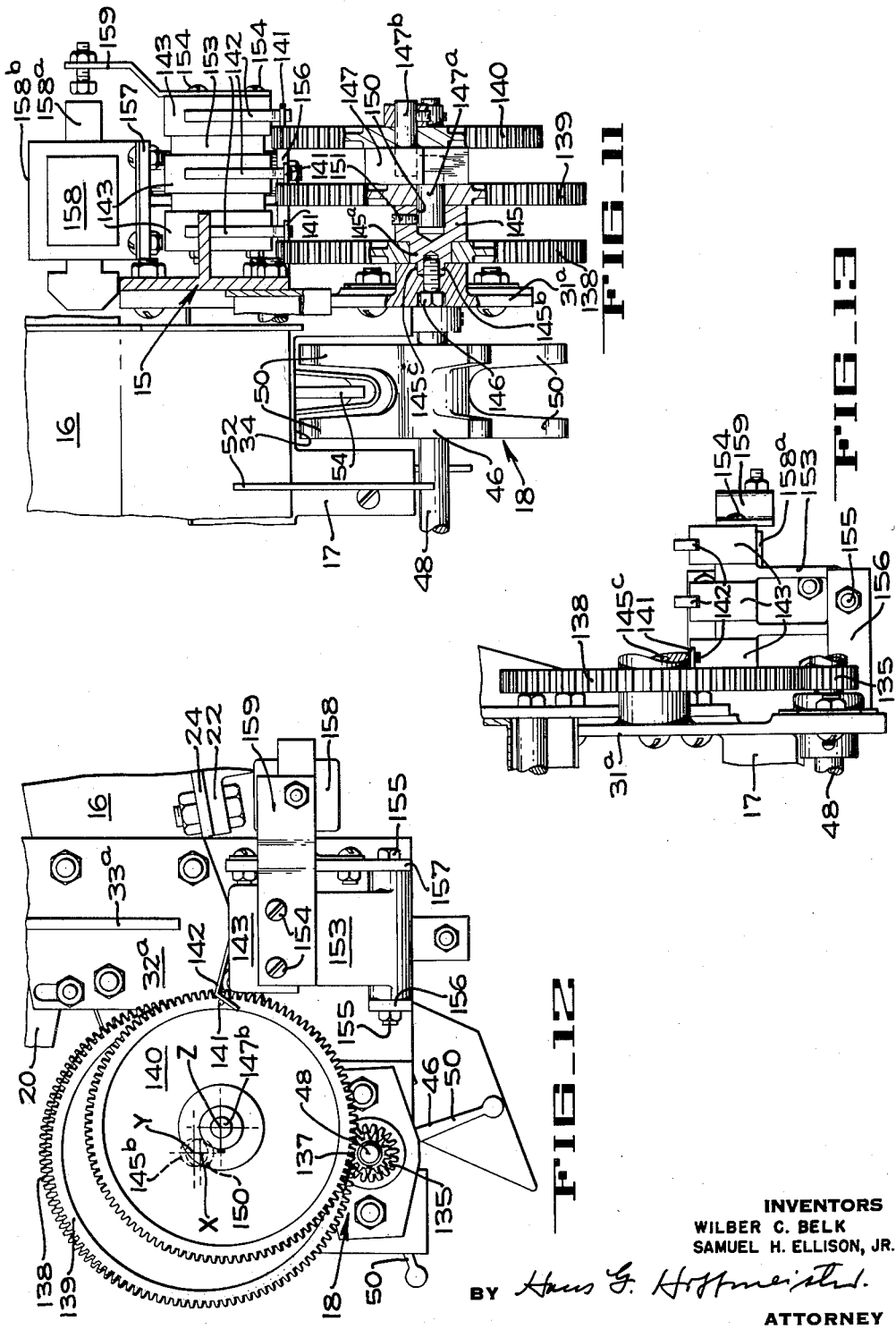

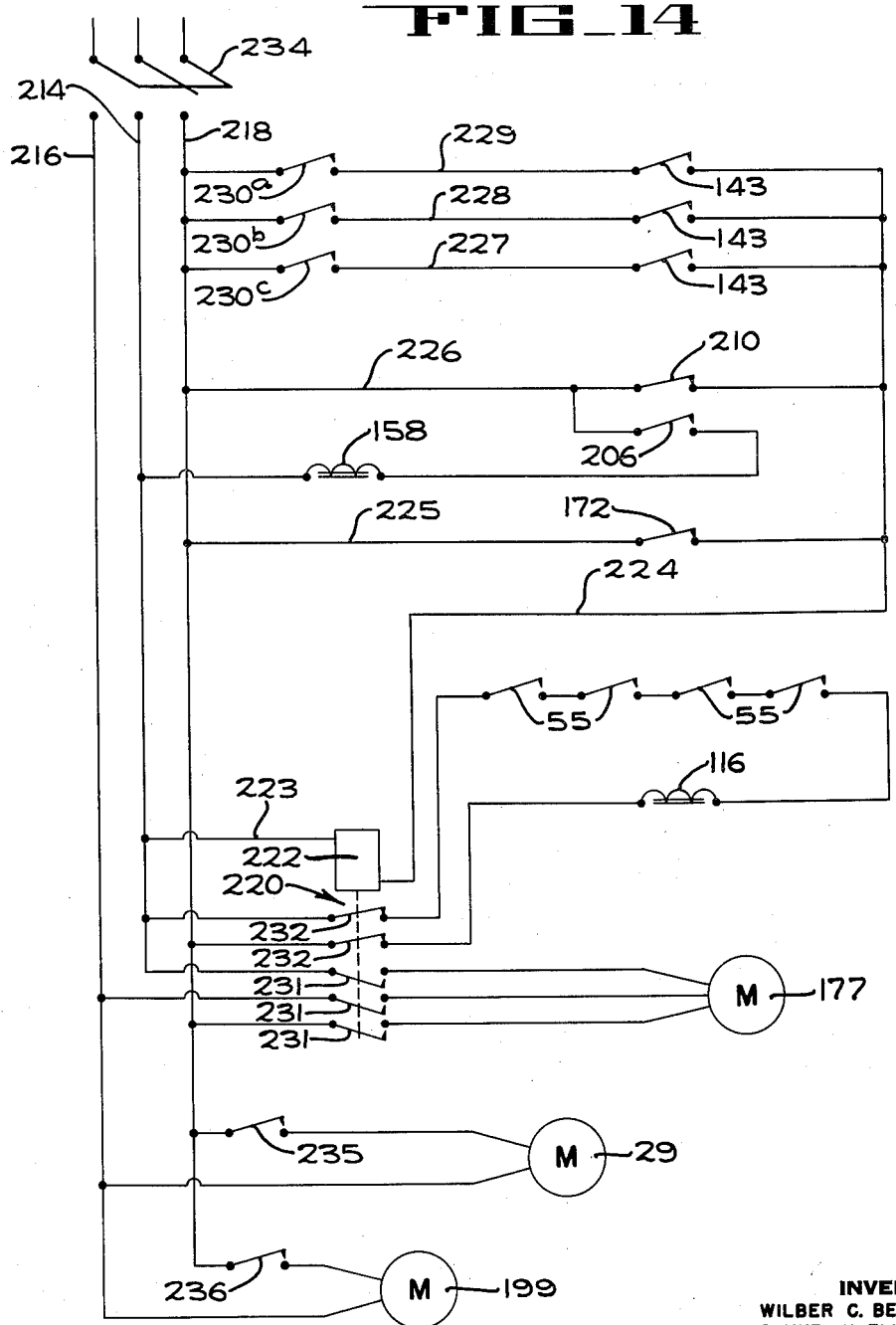

United States Patent Office 3,018,592
Patented Jan. 30, 1962

3,018,592
CONTAINER FILLING APPARATUS
Wilber C. Belk and Samuel H. Ellison, Jr., Lakeland, Fla., assignors to FMC Corporation, a corporation of Delaware
Filed Oct. 30, 1958, Ser. No. 770,821
14 Claims. (Cl. 53—61)

The present invention relates to apparatus for filling articles into containers, and more particularly to apparatus for automatically filling a predetermined number of articles into each of a succession of containers.

In the packaging art, it is often necessary that containers be filled with a particular number, rather than with a particular weight or volume of articles. The packaging of articles according to their number is important, for example, in the citrus fruit industry, since citrus fruit is usually purchased by number. In the packaging of citrus fruit or other articles, it may also be necessary that means be provided for readily changing the number of articles filled into each container.

It is therefore an object of the present invention to provide apparatus for depositing a particular number of articles within a container.

Another object of the invention is to provide apparatus for automatically filling a predetermined number of articles into each of a succession of containers.

Another object of the present invention is to provide apparatus capable of depositing within a container any one of several possible counts of articles.

Another object of the invention is to provide apparatus for automatically filling a predetermined number of articles into a container, and automatically replacing the filled container with an empty container to be filled.

These and other objects of the present invention will become apparent from the following description, read in conjunction with the accompanying drawings, in which:

FIG. 4 is an enlarged diagrammatic vertical section, with parts broken away, taken on line 4—4 of FIG. 1.

FIG. 5 is a vertical section taken on line 5—5 of FIG. 4.

FIG. 6 is an enlarged fragmentary horizontal section taken on line 6—6 of FIG. 2.

FIG. 7 is an enlarged fragmentary vertical section taken along the line 7—7 of FIG. 2.

FIG. 8 is a vertical section taken along the line 8—8 of FIG. 7.

FIG. 9 is an enlarged fragmentary perspective of a portion of the apparatus of FIG. 1.

FIG. 10 is a horizontal section taken along the line 10—10 of FIG. 7.

FIG. 11 is an enlarged horizontal section taken along the line 11—11 of FIG. 2, with parts broken away.

FIG. 12 is a side elevation of the portion of the apparatus shown in FIG. 11.

FIG. 13 is an end elevation of the portion of the apparatus shown in FIG. 11, parts being broken away.

FIG. 14 is a wiring diagram illustrating the electrical control circuit used in the apparatus of FIG. 1.

Figure 1:
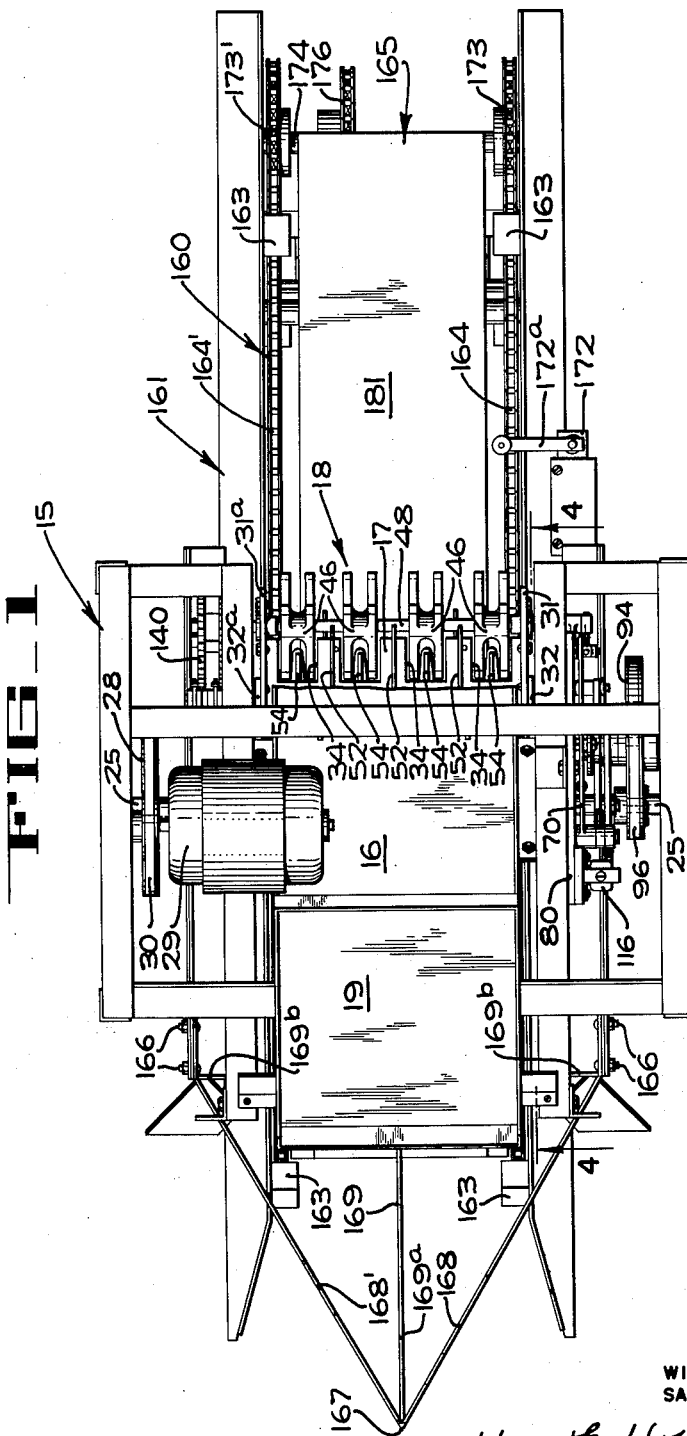
FIG. 1 is a plan of the container filling apparatus of the invention.

The container filling apparatus of the present invention comprises a frame suport structure 15 (FIGS. 1, 2 and 3) on which is mounted a vibratable main hopper 16 (FIG. 4) adapted to receive oranges or other fruit from an endless belt feed conveyor or the like (not shown) and to deliver the fruit to a stationary discharge hopper 17. A counting mechanism 18 is associated with the discharge hopper to control the discharge of oranges from the discharge hopper. An overflow hopper 19 is disposed above the main hopper 16 and a second overflow hopper 20 is disposed above the discharge hopper 17.

The main hopper 16 has a flat sloping bottom wall 16a and opposed side walls 16b and 16c projecting upwardly from the bottom wall. The hopper 16 is supported at its upper end by two resilient brackets 21 (FIGS. 3 and 4) each of which is connected between a frame member and a tab 16d secured to the undersurface of the hopper. Adjacent its lower end, the main hopper is supported on two pillow blocks 22 and 23 (FIG. 5), each block being secured to a plate 24 on the hopper and being mounted on a shaft 25 by an eccentric bearing sleeve 26 (FIG. 4). The shaft 25 is rotatably journalled at each end in a bearing block 27 (one only being shown in FIG. 3) mounted on a horizontal frame member. At one side of the frame, a pulley 28 (FIG. 2) is keyed to the shaft 25 and is arranged to be driven by a motor 29 through a belt 30.

The stationary discharge hopper 17 has vertical side walls 31 and 31a (FIG. 2) which are bolted to vertical plates 32 and 32a, respectively, said plates being connected to the frame 15 by webs 33 and 33a, respectively. The discharge hopper 17 has an inclined flat bottom wall which is provided with four rectangular recesses 34 (FIG. 1).

Figure 2:
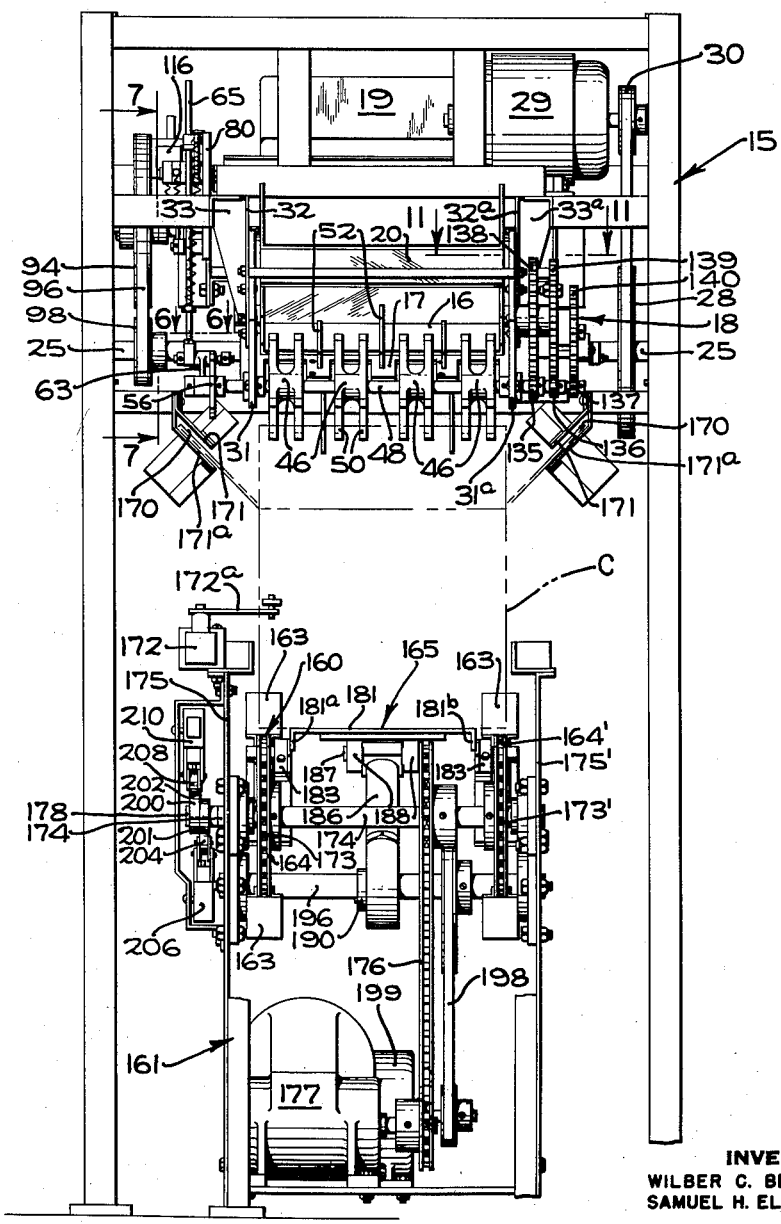
FIG. 2 is an end elevation of the apparatus of FIG. 1.
Figure 3:
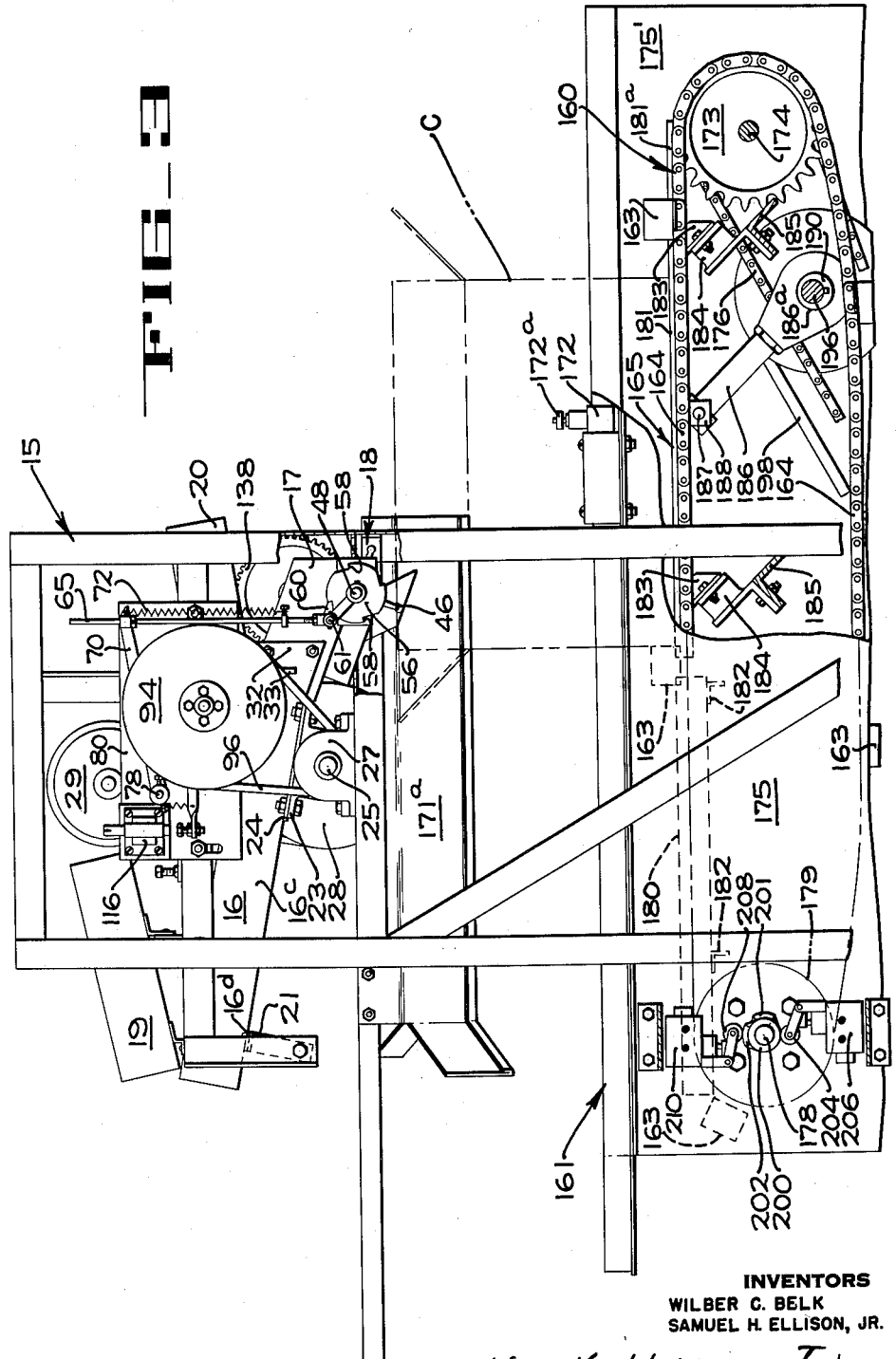
FIG. 3 is a side elevation of the apparatus of FIGS. 1 and 2, being partly broken away and partly in section.

The fruit counting and discharge mechanism 18 comprises four star wheels 46 (FIGS. 1 and 2) keyed to a rotatable shaft 48 journalled adjacent its ends in the side walls 31 and 31a, respectively, of the stationary hopper 17. As seen in FIG. 7, each of the star wheels 46 is provided with four equally spaced radially extending legs 50 each of which is of U-shape (FIGS. 1 and 2). The legs 50 of each star wheel are adapted upon rotation thereof to pass through one of the recesses 34 in the bottom wall of the stationary hopper 17. A vertical separator plate 52 is mounted on and projects upwardly from the bottom wall 16a of the hopper 16 and to a location in hopper 17 between each pair of adjacent star wheels, whereby a fruit lane is provided for directing fruit to each star wheel. It will be understood that when oranges or other such fruit are introduced into the main hopper 16, they will roll downward into the hopper 17 and into a lane between the plates 52, and the first orange in each fruit lane will come to rest in a pocket formed between adjacent legs 50 of the star wheel 46 at the lower end of the lane. When the star wheel is rotated, the orange will be discharged from the pocket into a carton disposed at the loading station below the star wheels.

Means are provided to assure that an orange is present in a particular pocket of each of the four star wheels before any of the star wheels 46 will be rotated. These means include four switch actuator arms 54 (FIG. 1) which project into the four lanes, respectively, at the entrance end of the star wheels, each of said arms 54 being adapted to close a normally open switch 55 (FIG. 7) when contacted by an orange as it moves into the associated pocket. The end of the shaft 48 journalled in the plate 31 extends outward beyond the latter and is secured to a ratchet wheel 56 (FIGS. 3 and 7) which has four teeth 58 spaced equidistantly around the circumference thereof. The ratchet wheel 56 is rotated in 90° increments by means of a pawl 60 which is mounted adjacent the right end (FIG. 6) of a short shaft 61 rotatably supported by a hub 62 formed on the outer end of a radially extending lever 63 rotatably mounted at its inner end on the shaft 48 by means of a hub 64. A vertically extending actuator rod 65 is pivotally connected to the shaft 61 by means of a hub 66 (FIG. 6) that is pivoted on said shaft adjacent the left end thereof. The side by side arrangement of the pawl 60, the hub of lever 63 and the hub 66 of rod 65 is maintained by two set collars 67 and 68 secured at the respective ends of the shaft 61, and a torsion spring 69 (FIG. 6) disposed between the set collar 68 and the pawl 60.

The actuator rod 65 is operated by means of a cam follower arm 70 (FIG. 7), to the outer end of which is connected the upper end of a spring 72. At its lower end, the spring 72 is connected to a collar 74 secured on the rod 65. A guide block 76, which is slidable on the rod 65, has a stub shaft 77 (FIG. 10) pivotally secured to the cam follower arm 70 adjacent the outer end thereof. The cam follower arm 70 is pivotally supported at its inner end upon a horizontally extending stub shaft 78 (FIG. 7) carried by a mounting plate 80 which is mounted on the frame 15. The cam follower arm 70 is adapted to be moved by means, to be described hereinbelow, to the position shown in phantom lines when an orange is present in every hopper lane. Such movement causes the block 76 to engage a set collar 79 on the rod 65 and move the rod 65 downwardly until the pawl 60 reaches the phantom line position thereof. During this downward movement, the pawl 60 rides along the periphery of the ratchet wheel 56 until the torsion spring 69 forces the pawl into a recess of the ratchet wheel. When the cam follower arm 70 is again moved upwardly, it pulls the rod 65 upwardly by means of the spring 72, and during this upward movement of the rod 65, the pawl rotates the ratchet wheel through one quarter of a revolution causing the shaft 48 and the four star wheels keyed thereto to be rotated a quarter of a revolution. Accordingly, the fruit in all the star wheels will be discharged simultaneously.

The above described oscillating movement of the cam follower arm 70 is produced by a cam disk 81 (FIG. 7) mounted for rotation about a horizontally extending shaft 82 (FIG. 8) which is welded at one end in an opening 83 in the mounting plate 80. A rotatable cam follower member 84 (FIG. 7) carried by the arm 70 is maintained in contact with the edge of the cam disk 81 by a tension spring 85 connected between the arm 70 and ear 86 projecting from the mounting plate 80. Rotation of the cam disk 81 is controlled by a clutch mechanism 87 (FIGS. 8 and 9). The clutch mechanism 87 comprises a generally cylindrical clutch body 88 rotatably mounted on the shaft 82 and secured to the cam disk 81, and a clutch plate 90 also mounted for rotation on the shaft 82 and having a plurality of grooves 92 on the inner face thereof. The clutch plate 90 is secured to a pulley wheel 94 (FIGS. 3 and 8) rotatable on the shaft 82, said pulley wheel being constantly driven by a belt 96 from a drive pulley 98 (FIG. 2) keyed to the shaft 25. The clutch body 88 is formed with a cylindrical bore 100 (FIGS. 8 and 9) which is parallel to but displaced from the shaft 82. Within the bore 100 is disposed an elongated, generally cylindrical dog 102 which is urged toward the clutch plate 90 by a compression spring 104 also disposed within the bore 100 and seated against the cam disc 81. The clutch dog 102 has a flattened end portion 102a adapted to enter the grooves 92 in the clutch plate, and the dog is held against rotation in its movement toward the clutch plate by a pin 103 which is carried by the dog and slides in a groove 105 in the clutch body 88.

The clutch dog 102 has a groove 106 (FIG. 9) which is adapted to receive the inner end 107 of a clutch release lever 108 which is pivotally mounted on a horizontal shaft 110 (FIG. 7) supported by the mounting plate 80. The clutch body 88 is formed with a circumferentially extending groove 112 (FIG. 8) which is vertically aligned with the inner end 107 of the clutch release lever 108, so that said inner end 107 can be pivoted into and out of the groove 112 regardless of the rotational position of said clutch body. The release lever 108 has a sharpened or wedge-shaped camming surface or portion 108a (FIG. 9) which is normally disposed in the path of movement of the dog 102 (FIG. 8) as the dog is rotated with the clutch body. It will be noted that even when the dog is shifted into engagement with the clutch plate 90, a portion of the transverse groove 106 (FIG. 9) is still in vertical alignment with the clutch release lever 108. Accordingly, as seen in FIG. 7, as the clutch body is rotated clockwise, the groove 106 comes into engagement with the wedge-shaped portion 108a of the lever 108. Continued rotation of the clutch body causes the dog to be cammed toward the right (FIG. 8) out of engagement with the clutch plate 90 against the resistance of spring 104.

The position of the clutch release lever 108 is controlled by a tension spring 114 (FIG. 7) and a solenoid 116. The spring 114 is connected at its lower end to the lever 108 adjacent one end of the lever and, at its upper end, is connected to a setscrew 118 carried by a collar 120 secured to the shaft 78. Said spring thus tends to pivot the lever 108 in a clockwise direction (FIG. 7) urging the wedge-carrying end of the lever 108 into the groove 112 of the clutch body. The solenoid 116 is carried by the mounting plate 80, and is provided with a plunger 122 which, when the solenoid is energized, will be forced out of the solenoid housing and will strike the head of a bolt 124 carried at the outer end of the lever 108. When the plunger 122 does so strike the bolt head, lever 108 is pivoted in a counterclockwise direction (FIG. 7) to disengage the lever 108 from the dog and permit the spring 104 to urge the dog into engagement with the clutch plate.

A brake lever 126 is supported at its inner end by a pivot pin 128 extending outwardly from the mounting plate 80. The lever 126 is formed along its upper edge with a curved braking surface 126a (FIG. 7) which is maintained in contact with a groove 130 (FIGS. 8 and 9), extending circumferentially around the clutch body 88, by means of a spring 131 (FIG. 7) which is connected between the outer end of the brake lever and a setscrew 132 carried by a collar 133 (FIG. 8) positioned on the shaft 78 alongside the collar 120. The brake lever 126 serves to slow down the clutch body 88 after the dog has been wedge out of engagement with the clutch plate so that the dog will be moving relatively slowly when it comes into engagement with a lip 134 formed on the end of the clutch release lever 108 to halt rotation of the cam disc 81.

Operatively associated with the star wheel shaft 48 at the right end thereof, as viewed in FIG. 2, is the fruit counting mechanism 18 which includes three spaced pinion gears 135, 136 and 137 keyed to the shaft 48 and in mesh respectively with three counting gears 138, 139 and 140. Each of the counting gears has an actuator pin 141 (FIG. 11) projecting from its side face adjacent its periphery, and each pin is arranged after a full rotation of the associated gear to engage a switch actuator arm 142 and actuate a switch 143 to energize a control circuit and operate a control mechanism which will be explained presently.

Since four oranges are discharged during each one quarter revolution of the star wheel shaft, it is evident that sixteen oranges are discharged during each full revolution of the shaft. Pinion gear 135 has sixteen teeth, and the counting gear 138 with which it meshes has 108 teeth. It will take 6¾ revolutions of the pinion gear to cause one revolution of the counting gear 138. Since 6¾ revolutions of the star wheel causes the discharge of 108 oranges, it is evident that one revolution of the counting gear 138 will bring its actuator pin 141 into engagement with the associated switch 143 after 108 oranges have been counted. Therefore, if this switch 143 is selectively connected into the control circuit, the control operation will be carried out after each 108 oranges have been counted.

The pinion gear 136 has 12 teeth and its associated counting gear 139 has 108 teeth. Accordingly, nine revolutions of the pinion gear 136 will cause 144 oranges to be discharged and will cause the counting gear 139 to make one complete revolution whereby to actuate the associated switch 143.

Similarly, the pinion gear 137 has 12 teeth and the associated counting gear 140 has 93 teeth. Accordingly, 7¾ revolutions of pinion gear 137 will cause 124 oranges to be counted and will cause the counting gear 140 to make one complete revolution whereby to actuate the associated switch 143.

Since the counting gears 138 and 139 have different pitch diameters than the counting gear 140 and since the pinion 135 has a different pitch diameter than the pinions 136 and 137, the counting gears must be mounted for rotation at different distances from the star wheel shaft 48. This is accomplished by rotatably mounting counting gear 138 on a reduced diameter axle portion 145a (FIG. 11) of a mounting member 145 that is fixedly secured to the wall 31a of the stationary hopper 17 by a capscrew 146, and has a further reduced diameter shaft portion 145b disposed in a cylindrical recess 145c in wall 31a. The counting gear 139 is rotatably journalled on a stub shaft 147a projecting from one face of a block 147 that has a second stub shaft 147b projecting from its opposite face. The stub shaft 147a is secured in a bore 150 in the mounting member 145. As seen in FIG. 12, the axis X of bore 150 is disposed eccentrically relative to the axis Y of shaft portion 145b and the axis Z of stub shaft 147b is displaced from both axes X and Y.

To assemble the counting gears in meshing relation with their associated pinion gears, the counting gear 138 is placed on stub shaft 145a and the end portion 145b of the shaft is placed in recess 145c. This automatically positions the counting gear 138 in mesh with pinion gear 135. The counting gear 139 is positioned on stub shaft 147a which is inserted in opening 150 and locked therein by setscrew 151. The gear 139 and the mounting member 145 are then rotated as a unit to shift axis X relative to axis Y to move gear 139 into mesh with the pinion 136. When this position is attained, the capscrew 146 is actuated to lock the mounting member 145 in place. The setscrew 151 is then loosened, permitting the rotation of the block 147 to shift the axis Z and bring the counting gear 140 into mesh with pinion gear 137. When this position is reached, the setscrew 151 is again threaded into engagement with stub shaft 147a to lock the gear 140 in adjusted position.

The three switches 143 associated with the counting gears are secured to the upper ends of a U-shaped bracket 153 (FIG. 13) by bolts 154. The bracket 153 is pivotally mounted on a bolt 155 (FIG. 12) that extends between two vertical mounting plates 156 and 157 which are secured to the side plate of the stationary discharge hopper 17. At the end of a fruit counting operation, a pin 141 on one of the counting gears is in engagement with the actuator arm 142 of one of the switches 143. To clear this switch so that a new counting operation can be started, the bracket 153 is pivoted a short distance on bolt 155 to move the arm 142 out of engagement with the pin 141. This pivoting of bracket 153 is accomplished by the plunger 158a (FIG. 11) of a solenoid 158, said plunger being arranged to move out of the solenoid housing 158b and contact a bracket 159 that is secured to one of the switches 143 by the bolts 154 which also secure the switches to the bracket 153.

When the actuator arm 142 of the switch 143, that has been selectively connected in the control circuit, is engaged by the associated pin 141, the switch is closed and a circuit is energized to actuate a conveyor 160 (FIGS. 1 and 2) which is mounted on a base structure 161 (FIG. 3) and carries the container C, that has just been filled, away from the filling station below the star wheels and advances the container next behind into position to be filled. The conveyor 160 comprises two laterally spaced conveyor chains 164 and 164' (FIG. 1) which have pusher members 163 that engage the containers and advance them from left to right as viewed in FIG. 1 along a loading platform 165. The side flaps at the top of each carton are cammed open by means of a member 167 (FIG. 1) mounted on the frame 15 at the receiving end of the conveyor chains. The member 167 is formed of two horizontal side straps 168 and 168' joined together at their forward ends and secured on the frame 15 at their rearward ends by bolts 166. A T-shaped reinforcement strap 169 has a stem 169a connected to the straps 168 and 168' at the point of joinder of the latter, and the cross bar of said T-shaped strap 169 is connected at its ends 169b to the straps 168 and 168', respectively, adjacent the rearward ends of the latter. After being cammed open, each side flap is directed in a slot 170 (FIG. 2) formed between two guide plates 171 and 171a which are secured to the frame. When the container reaches filling position, it strikes the switch arm 172a of a normally closed switch 172 (FIGS. 1–3) mounted adjacent the conveyor surface, and thus opens said switch.

The conveyor chains 164 and 164' are driven by two sprocket wheels 173 and 173' (FIG. 2), respectively, said sprocket wheels being secured to a shaft 174 extending between two side plates 175 and 175' of the base 161 at the forward end thereof. The shaft 174 is rotated by means of a chain and sprocket drive 176 connected to a motor 177 which is supported below said shaft by any suitable means. Mounted between the side plates 175 and 175' adjacent the rearward end thereof is a rotatable shaft 178 (FIG. 3) which journals two idler sprockets 179 (only one sprocket being seen) around which the conveyor chains 164 and 164' are trained, respectively.

The loading platform 165 comprises a fixed plate 180 and a movable plate 181 disposed in generally aligned relation to support containers as they are moved toward the filling station. The plate 180 is secured to two fixed transverse bars 182 that extend between the side plates 175 and 175' of the base 161. The movable plate 181 has downturned side flanges 181a and 181b (FIG. 2), and each flange has two spaced pads 183 (FIG. 3) welded thereto. Each of the pads 183 is in contact with a rubber pad 184 secured to a fixed transverse angle bar 185. With this arrangement, the movable plate 181 is resiliently supported on four rubber pads so that it can be vibrated by a shaker arm 186 which has one end pivotally mounted on a shaft 187 disposed in spaced ears 188 (FIG. 2), projecting downwardly from the undersurface of the movable plate 181. The other end of the shaker arm 186 has a cylindrical opening 186a which receives an eccentric bushing 190 that is keyed to a power driven shaft 196. The shaft 196 is driven by a motor 199 through a belt and pulley drive 198.

As seen in FIG. 2, the end of the sprocket idler shaft 178 supported by the side plate 175 extends outward beyond the latter and carries thereon a collar 200 bearing two cams 201 and 202, which cams are axially spaced on the collar 200. The inner cam 201 cooperates with a switch arm 204 (FIG. 3) of a normally open microswitch 206 controlling a circuit which, when closed, will energize the switch-clearing solenoid 158, while the outer cam 202 cooperates with a switch arm 208 of a normally closed microswitch 210 for a purpose to be described hereinbelow. Each of the idler sprockets 179 carried by the shaft 178 has exactly as many teeth as there are links in the conveyor chains 164 and 164' between successive pusher lugs 163 which are spaced apart a distance only slightly greater than the length of the container C and which drive the containers to be filled. Timing of operation of the cams 201 and 202 is thus made possible.

Operation of the apparatus of the invention will be described with particular reference to the wiring diagram of FIG. 14. The electrical system of the apparatus is operated from three conductors 214, 216 and 218, which are connected by a main switch 234 to a suitable source of electric power (not shown). A relay 220 is employed, which relay includes an electromagnetic coil 222 connected at one end to the conductor 214 through a line 223, and connected at its other end through a line 224 to five circuits connected in parallel between the conductor 218 and said line 224. The first of these parallel circuits 225 includes the container-actuated switch 172, while the second circuit 226 includes the cam operated switch 210. The remaining three circuits 227, 228 and 229 each includes one of the microswitches 143 associated with the counting gears, and a manually operable selector switch 230a, 230b or 230c interposed between the conductor 218 and the associated microswitch 143.

The motor 177 which drives the box conveyor is connected in circuits having three contacts 231 of the relay 220. These contacts are normally open, and are closed when the coil 222 is energized. The star wheel switches 55 and the clutch release solenoid 116 are connected in series with two relay contacts 232 which are normally closed, and which are held open when the coil 222 is energized. The cam operated switch 206 and the solenoid 158, which pivots the switch bracket to clear the switches at the end of a counting cycle, are connected in series between the conductor 214 and the line 226. The hopper vibrating and counting mechanism drive motor 29 and the platform vibrating motor 199 are each connected between the conductors 216 and 218.

In the operation of the apparatus of the invention the main switch 234 is closed to energize lines 214, 216 and 218. Switches 235 and 236 are then manually closed to energize the motors 29 and 199. These motors operate continuously and, accordingly, the main hopper 16 is continuously vibrated, the clutch plate 90 is continuously rotated, and the box platform is continuously vibrated. The selector switch, as for example switch 230a which is in the circuit of the switch 143 that is associated with the counting gear that will cause the desired number of oranges to be counted, is then closed. Since switch 172 is normally closed, the relay 220 is energized and the contacts 231 are closed as soon as the main switch 234 is closed. Accordingly, conveyor drive motor 177 is immediately energized and cartons are advanced toward the filling station under the star wheels. The first carton, upon reaching the filling station, opens the switch 172 and deenergizes relay 220. As a result, the contacts 231 are opened and the carton conveyor is stopped. At the same time, the contacts 232 are closed, to ready the circuit in which the clutch release solenoid 116 and the star wheel switches 55 are connected. Articles such as oranges are meanwhile fed into the upper end of the hopper 16, and roll or slide down into the fruit lanes at the lower end of the discharge hopper 17. Vibration of the hopper 16, as a result of the continuous operation of the motor 29, assures that the oranges keep moving down the hopper, and fill each of the lanes. When there is one orange in a star wheel pocket of each lane, all of the star wheel switches 55 will be closed and the solenoid 116 will as a result be energized. The solenoid 116 disengages the clutch release lever 108 from the clutch dog 102, and the latter will be pressed by the spring 104 into engagement with the clutch plate 90. The continuously rotating clutch plate 90 rotates the clutch body 88 and the cam disk 81 causing the ratchet mechanism to index the star wheels one quarter of a revolution. This indexing movement causes four oranges to be discharged and causes the selected counting gear to be rotated through a few degrees of angular movement. As soon as the four oranges are discharged, four more oranges will drop into the pockets of the star wheels to again close switches 55. Thus, the repeated discharge of oranges in groups of four is carried out until the pin 141 on the counting gear actuates the associated switch 143. Closing of switch 143 energizes relay 220 causing contacts 232 to open for deenergizing the circuit containing the clutch release solenoid 116 and causing contacts 231 to close to start the carton conveyor whereby the filled carton is moved away from the filling station and an empty carton is advanced to the filling station.

If the carton conveyor is filled with cartons, the switch 172 will be continuously held open and the movement of the conveyor is controlled by the two cams 202 and 201 on the idler sprocket shaft 178. As previously mentioned, one revolution of the shaft 178 corresponds to the movement of a carton a distance equal to the length of one carton.

Accordingly, after a carton has been filled and the conveyor has been energized through the counter switch 143, cam 202, which up to this time has been holding switch 210 open, moves out of contact with switch 210 permitting it to close to ready a circuit that includes conductor 226. As the filled carton is moved away from the filling station, cam 201 momentarily closes switch 206 to energize the solenoid 158 which swings all the counter switches 143 away from their associated counter gears. The solenoid 158 is immediately deenergized, permitting the switches to swing back to operating position with the actuator arm of the active counter switch 143 on the trailing side of the actuator pin of the active counting gear. When the carton reaches the filling station, the cam 202 opens switch 210 to deenergize relay 220, and stop the carton conveyor.

If a gap appears between cartons on the conveyor, the switch 172 will remain closed and keep the relay energized until a carton is at the loading zone. Since the cams 201 and 202 are coordinated with the movement of the pusher lugs on the carton conveyor, the cams will automatically take over the control of the conveyor.

While we have described a particular embodiment of the present invention, it will be understood that various changes and modifications may be made without departing from the spirit of the present invention and the scope of the appended claims.

Having thus described our invention, what we claim as new and desire to protect by Letters Patent is:

1. Apparatus for filling articles into containers, comprising a hopper having an article discharge outlet, article discharge means located adjacent said outlet and including a rotatable shaft arranged to rotate during the discharge of articles through said outlet, a plurality of pinion gears keyed to said rotatable shaft, a plurality of rotatable article counting gears in mesh with said pinion gears and adapted upon rotation to count different numbers, respectively, of articles discharged through said outlet, and means operated by a selected one of said counting gears for terminating the discharge of articles through said outlet.

2. Apparatus for filling articles into containers, comprising a hopper having an outlet for discharging articles therefrom, article discharge means positioned adjacent said outlet and operable by a ratchet and associated reciprocable pawl, pawl reciprocating means, a rotatable cam controlling said pawl reciprocating means, rotating drive means, a dog clutch operable to bring said rotatable cam into engagement with said rotating drive means, and means for operating said dog clutch in response to the presence at said outlet of an article to be discharged.

3. Apparatus according to claim 2, wherein said dog clutch comprises a clutch plate secured to said rotating drive means, a dog movable toward and away from said plate, spring means urging said dog into engagement with said clutch plate, a pivotally mounted lever normally engaging said dog and adapted to cam said dog out of engagement with said clutch plate, and a solenoid having a plunger adapted upon energization of said solenoid to pivot said lever out of engagement with said dog, said solenoid being connected for energization when an article is present at said outlet.

4. Apparatus for filling articles into containers, comprising a hopper having an outlet for discharging articles therefrom, article discharge means positioned adjacent said outlet, article counting means operable by said article discharge means, an electric switch adapted for actuation by said article counting means, conveyor means operative to conduct a container into position for filling from said outlet and to conduct away a container after filling thereof, and control means in circuit with said electric switch, said control means being adapted to check operation of said article discharge means and to initiate operation of said conveyor means when said electric switch is operated by said article counting means.

5. In an apparatus for discharging articles from a hopper, a counting mechanism comprising a rotatable shaft movable through a fixed angular distance during the discharge of each article, a plurality of pinion gears keyed to said shaft, a counting gear associated with each pinion gear, means for mounting each counting gear in mesh with its associated pinion gear comprising a mounting member having an axle portion parallel to but spaced from the axis of said rotatable shaft and adapted to journal one of said counting gears, means providing a cylindrical opening in said mounting member having an axis parallel to but offset from the axis of said axle portion, a block having a first stub shaft disposed in said opening and adapted to journal another of said counting gears, and means providing a second stub shaft on said block parallel to but offset from said first stub shaft and adapted to journal another of said counting gears, rotary adjustment of said mounting member being effective to shift the axis of said cylindrical opening, and rotary adjustment of said block being effective to shift the axis of said second stub shaft.

6. Apparatus for filling articles into containers, comprising a hopper having an outlet for discharging articles therefrom, article discharge means positioned adjacent said outlet, article counting means adapted to count the number of articles discharged from said outlet, conveyor means operative to conduct a container into position for filling from said outlet and to conduct away a container after filling thereof, and control means adapted to check operation of said conveyor means and to initiate operation of said article discharge means when a container is in position for filling from said outlet, said control means being further adapted to check operation of said article discharge means and to initiate operation of said conveyor means when a predetermined number of discharged articles has been counted by said article counting means.

7. Apparatus for filling articles into containers, comprising a hopper having an outlet for discharging articles therefrom, a star wheel rotatable to discharge articles from said outlet, means for rotating said star wheel, an electric control circuit for said star wheel rotating means, article counting means operable by said star wheel upon rotation thereof, conveyor means for conducting a container into position for filling from said outlet and conducting away a container after filling thereof, and control means including a switch arranged to be actuated by a container reaching said filling position and adapted when actuated to check operation of said conveyor means and to partially close said circuit to prepare said star wheel rotating means for rotating said star wheel, means responsive to the positioning of a predetermined number of articles at said hopper discharge outlet for completing the energizing of said circuit, said control means being further adapted to deenergize said circuit to prevent operation of said means for rotating said star wheel and to initiate operation of said conveyor means when a second predetermined number of discharged articles has been counted by said article counting means.

8. In an apparatus for filling articles into containers, a rotary article discharge mechanism, electrically operated means for actuating said discharge mechanism, a circuit arranged when energized to activate said means, a rotary shaft movable through a predetermined angular movement during each movement of said article discharge mechanism, a plurality of pinion gears secured to said shaft, a counting gear in mesh with each pinion gear, an actuating member on each counting gear, a switch disposed in the path of movement of each actuating member, said switches being connected in parallel in said circuit, and means for connecting one of said switches in said control circuit and disconnecting the remainder of said switches from said circuit so that said circuit will be deenergized when said one switch is actuated by the associated actuating member.

9. Apparatus for filling articles into containers, comprising a hopper having an outlet for discharging articles therefrom, article discharge means positioned adjacent said outlet, a plurality of article counting members adapted to count different numbers, respectively, of articles discharged from said outlet, a plurality of electric switches operable by said article counting members upon discharge from said outlet of said different numbers of articles, respectively, means for selectively energizing one of said electric switches, conveyor means operative to conduct a container into position for filling from said outlet and to conduct away a container after filling thereof, and control means connected to said electric switches, said control means being adapted to check operation of said article discharge means and to initiate operation of said conveyor means upon operation of an energized electric switch.

10. Apparatus according to claim 9, each of said electric switches having an operating arm, each of said article counting members bearing a pin adapted to contact the arm of the respective electric switch for operation thereof, said apparatus including bracket means mounting said switches and movable to clear the arm of an operated switch from contact with the pin of the corresponding article counting member, and means for moving said bracket means in response to the conduction away of a filled container by said conveyor means.

11. Apparatus for filling articles into containers, comprising a conveyor adapted to present empty containers in succession at a container filling station and to remove containers when filled, drive means for said conveyor, a control circuit for said drive means, a first switch in said circuit arranged upon being closed to activate said drive means when a container has been filled at said container filling station, a shaft rotatable by said conveyor through a predetermined angular distance between the time of presentation of an empty container on said conveyor at said container filling station and the time of presentation of the succeeding empty container to said station, first and second cam means on said shaft, means including a second switch in said circuit operable by said first cam means for opening said first switch to terminate operation of said conveyor drive means upon the removal of a filled container from said container filling station, and a third switch in said circuit operable by said second cam means and adapted to maintain said conveyor drive means activated from the time of removal of the filled container from the container filling station until the time of presentation of an empty container and to then deactivate said drive means.

12. Apparatus for filling articles into containers, comprising a hopper having an article discharge outlet, article discharge means mounted adjacent said outlet, and means including a clutch mechanism adapted when said clutch mechanism is engaged to actuate said article discharge means, said clutch mechanism comprising a rotatable clutch body connected to said discharge means, a clutch dog slidable in said clutch body and having a groove in one surface thereof, a constantly rotating clutch plate adapted for engagement by said clutch dog, spring means urging said clutch dog into engagement with said clutch plate, a lever formed at one end with a camming surface, spring means urging said one end of said lever into a position for engaging said groove and for camming said clutch dog out of engagement with said clutch plate, and means operative when articles are present at said discharge outlet to urge said one end of said level out of said position, whereby said clutch dog will engage said clutch plate.

13. Apparatus for filling articles into containers, comprising a hopper having an outlet for discharging articles therefrom, article discharge means positioned adjacent said outlet and operable by a ratchet and associated reciprocable pawl, pawl reciprocating means, a rotatable cam controlling said pawl reciprocating means, rotating drive means, a clutch operable to bring said rotatable cam into engagement with said rotating drive means, and means for operating said clutch in response to the presence at said outlet of an article to be discharged.

14. Apparatus for filling articles into containers, comprising a hopper having an article discharge outlet, article discharge means mounted adjacent said outlet, and means including a clutch mechanism adapted when said clutch mechanism is engaged to actuate said article discharge means, said clutch mechanism comprising a rotatable clutch body connected to said discharge means, a clutch contact member movable in said clutch body and having a groove in one surface thereof, a constantly rotating clutch plate adapted for engagement by said contact member, spring means urging said contact member into engagement with said clutch plate, a lever formed at one end with a camming surface, spring means urging said one end of said lever into a position for engaging said groove and for camming said clutch contact member out of engagement with said clutch plate, and means operative when articles are present at said discharge outlet to urge said one end of said lever out of said position, whereby said clutch contact member will engage said clutch plate.

References Cited in the file of this patent
UNITED STATES PATENTS

| | | |
|---|---|---|
| 802,549 | Batdorf | Oct. 24, 1905 |
| 1,737,877 | Crosby et al. | Dec. 3, 1929 |
| 1,900,907 | Buxton | Mar. 14, 1933 |
| 2,144,708 | Rau | Jan. 24, 1939 |
| 2,204,126 | Domke | June 11, 1940 |
| 2,574,196 | Solomon et al. | Nov. 6, 1951 |
| 2,713,446 | Vaughan | July 19, 1955 |
| 2,782,577 | Beall | Feb. 26, 1957 |
| 2,812,137 | Curtis et al. | Nov. 5, 1957 |